(12) United States Patent
Taira

(10) Patent No.: US 9,372,312 B2
(45) Date of Patent: Jun. 21, 2016

(54) OPTICAL DEVICE

(71) Applicant: INTERNATIONAL BUSINESS MACHINES CORPORATION, Armonk, NY (US)

(72) Inventor: Yoichi Taira, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/607,548

(22) Filed: Jan. 28, 2015

(65) Prior Publication Data

US 2015/0139586 A1  May 21, 2015

Related U.S. Application Data

(60) Provisional application No. 14/299,227, filed on Jun. 9, 2014.

(30) Foreign Application Priority Data

Jun. 28, 2013   (JP) .................................. 2013-136862

(51) Int. Cl.
G02B 6/32 (2006.01)
G02B 6/30 (2006.01)
G02B 6/12 (2006.01)
G02B 6/25 (2006.01)
G02B 6/124 (2006.01)

(52) U.S. Cl.
CPC .............. *G02B 6/32* (2013.01); *G02B 6/12004* (2013.01); *G02B 6/25* (2013.01); *G02B 6/30* (2013.01); *G02B 6/124* (2013.01); *Y10T 29/49* (2015.01)

(58) Field of Classification Search
CPC .................................. G02B 6/32; G02B 6/324
USPC ..................................................... 385/33, 16
See application file for complete search history.

(56) References Cited

U.S. PATENT DOCUMENTS 5,195,150 A * 3/1993 Stegmueller et al. ........... 385/33
2006/0239605 A1* 10/2006 Palen et al. ..................... 385/14

FOREIGN PATENT DOCUMENTS

| JP | S62154685 A | 7/1987 |
|---|---|---|
| JP | 01-183605 A | 2/1990 |
| JP | 05-241044 A | 9/1993 |
| JP | 2002-357737 A | 12/2002 |
| JP | 3917491 B2 | 5/2007 |

OTHER PUBLICATIONS

Van Laere et al., Journal of Lightwave Technology, vol. 27, No. 5, Mar. 2009, pp. 612-618.*

* cited by examiner

*Primary Examiner* — Kaveh C Kianni
(74) *Attorney, Agent, or Firm* — Tutunjian & Bitetto, P.C.; Jeff Tang

(57) ABSTRACT

An optical device and a method of manufacturing an optical device. The optical device includes: a conversion means for converting propagation light propagating through an optical waveguide into parallel light and for outputting the parallel light; and a first lens means for focusing the parallel light outputted from the conversion means on a core of an optical fiber. The method includes: converting propagation light propagating through an optical waveguide into parallel light; outputting the parallel light; and focusing, using a first lens, the parallel light on a core of an optical fiber.

8 Claims, 4 Drawing Sheets

PRIOR ART

OPTICAL DEVICE

CROSS-REFERENCE TO RELATED APPLICATION

This application is a divisional of U.S. patent application Ser. No. 14/299,227, filed Jun. 9, 2014, which claims priority under 35 U.S.C. §119 from Japanese Patent Application No. 2013-136862 filed Jun. 28, 2013, the entire contents of which are incorporated herein by reference.

BACKGROUND OF THE INVENTION

1. Field of the Invention

The present invention relates to an optical communication technology, and more specifically, to an optical device in which an optical waveguide and an optical fiber are optically coupled.

2. Description of Related Art

In optical communication, an optical signal in a silicon optical waveguide is required to optically couple to an optical cable on the outside of the waveguide. A grating (diffraction grating) structure created inside the slab structure of the silicon optical waveguide is often used to focus and couple the propagating light onto the core of an optical fiber. A schematic view of this type of optical device is shown in FIG. 1.

FIG. 1 (a) is a cross-sectional side view of the optical device 10, and FIG. 1 (b) is a plane view from below. In the optical device 10, an oxide layer (silicon oxide, silicon oxynitride or silicon nitride) 12 is provided on a silicon substrate 11, and a silicon optical waveguide 13 is formed on the oxide layer 12. A grating coupler 14 is also formed at one end of the silicon optical waveguide 13. In the grating coupler 14, a plurality of approximately concentric circular grooves are provided in parallel. An optical beam focused by the grating coupler 14 is aligned onto the core 15 of an optical fiber 16, and optical coupling is performed between the silicon optical waveguide 13 and the optical fiber 16.

In JP2002-357737A, an optical fiber guiding portion is formed in one surface of a glass substrate so as to optically couple an optical fiber with the glass substrate. A lens, the center of which is aligned with that of the optical fiber guiding portion, is formed on the other surface of the glass substrate, and the light passing through the glass substrate is focused by the lens onto the core of the optical fiber.

In JP05-241044A, an optical waveguide is cut so that an inclined surface is formed at the deflection point of the optical waveguide with respect to the surface of the substrate on which the optical waveguide has been formed. Light is reflected by the inclined end surface. A lens is formed on the optical waveguide in the vicinity of the inclined end surface, and the light reflected by the inclined end surface is focused by the lens and directed towards an optical element.

BRIEF SUMMARY OF THE INVENTION

The present invention provides an optical device including: a conversion means for converting propagation light propagating through an optical waveguide into parallel light and for outputting the parallel light; and a first lens means for focusing the parallel light outputted from the conversion means on a core of an optical fiber.

Another aspect of the present invention provides a method for manufacturing an optical device comprising: converting propagation light propagating through an optical waveguide into parallel light; outputting the parallel light; and focusing, using a first lens, the parallel light on a core of an optical fiber.

DETAILED DESCRIPTION OF THE PREFERRED EMBODIMENTS

Figure 1:
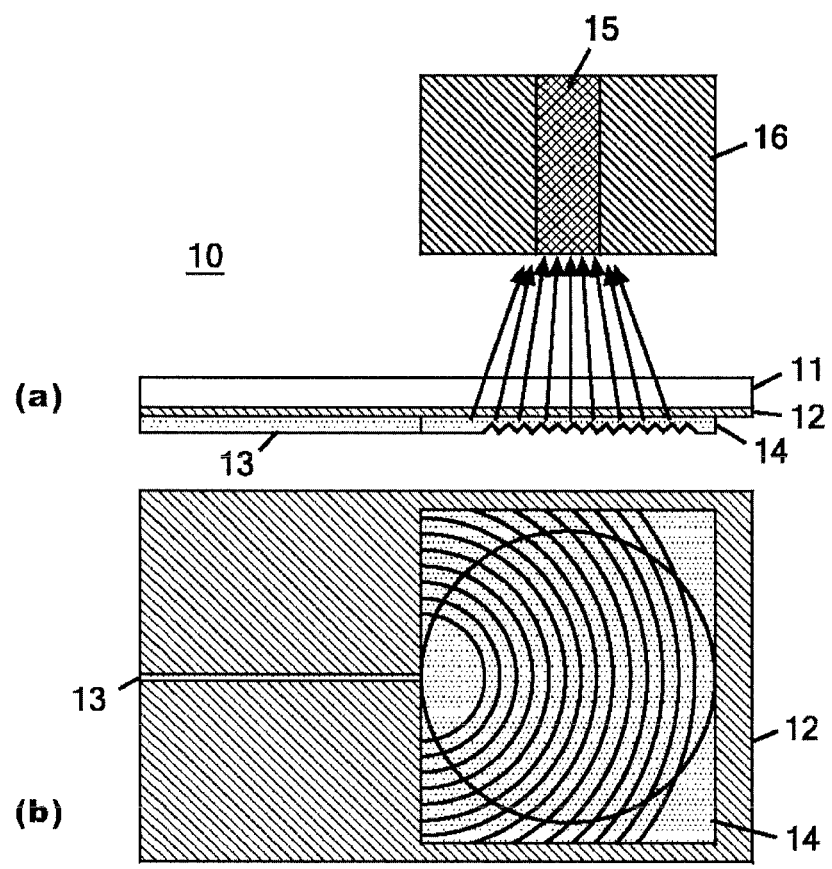
FIG. 1 is a diagram schematically illustrating an optical device in the prior art for optically coupling an optical waveguide and an optical fiber.

In a structure, as in optical device 10, in which an optical beam is focused by a grating coupler 14 and the focused light is directly aligned with the core 15 of the optical fiber 16, the optical fiber has to be aligned very precisely at the accuracy of one micrometer or less in order to achieve high optical coupling efficiency. It is an object of the present invention to realize optical coupling of an optical waveguide and an optical fiber without requiring direct alignment of the optical fiber with a high degree of precision. The object of the present invention includes providing an optical device that realizes optical coupling of an optical waveguide and an optical fiber in this way.

One embodiment of the optical device provided by the present invention includes a conversion means for converting propagation light propagating through an optical waveguide into parallel light and for outputting the parallel light in a space, and a lens means for focusing the parallel light in a space outputted from the conversion means onto the core of an optical fiber.

Preferably, according to an embodiment of the present invention, the conversion means includes a grating means (an optical diffraction means using an optical diffraction grating), in which the propagation light is bent at a right angle to become parallel light.

Preferably, according to an embodiment of the present invention, the grating means is a reflective surface provided with a plurality of V-shaped grooves arranged in parallel, in which the surface on one side of each V-shaped groove forms a 45-degree incline.

Preferably, according to an embodiment of the present invention, the conversion means includes a reflecting means forming a 45-degree incline for reflecting the propagation light, and another lens means, having a focal point at the point on which propagation light is reflected by the reflecting means, that converts the light reflected by the reflecting means into parallel light.

Preferably, according to embodiments of the present invention, the lens means has a convex lens surface on the parallel light side, and a recess for accommodating the optical fiber on the optical fiber side, the recess being formed so the parallel light is focused on the core of the optical fiber.

Preferably, the optical waveguide is a silicon thin-film waveguide.

The present invention realizes optical coupling of an optical waveguide and an optical fiber without requiring direct alignment of the optical fiber with a high degree of precision. The optical fiber does not have to be aligned with high precision of one micrometer or less. Instead, this precision can be relaxed to ten micrometers or more while still achieving high optical coupling efficiency.

The following is an explanation of a preferred embodiment of the present invention with reference to the drawings. However, this embodiment does not limit the present invention as described in the scope of the claims, and all combinations of characteristics explained in the embodiment are not necessarily required in the technical solution of the present invention. The present invention can be embodied in many different ways, and is by no means limited to the content of the embodiment described below. In the entire explanation of the embodiment, identical constituent parts and constituent elements are denoted by the same numbers.

Figure 2:
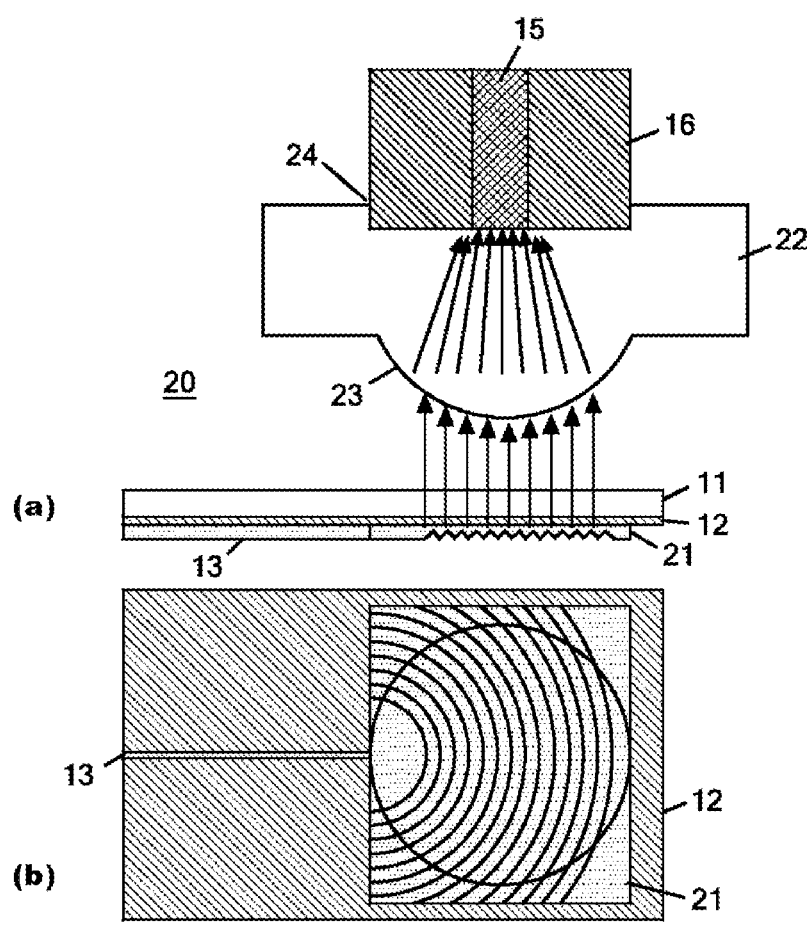
FIG. 2 is a diagram schematically illustrating an optical device for optically coupling an optical waveguide and an optical fiber in a first embodiment of the present invention.

FIG. 2 is a diagram schematically illustrating an optical device 20 for optically coupling an optical waveguide and an optical fiber in a first embodiment of the present invention. FIG. 2 (a) is a cross-sectional side view of the optical device 20, and FIG. 2 (b) is a plane view from below.

In this optical device 20, an oxide layer 12 is provided on a silicon substrate 11, and a silicon optical waveguide 13 is formed on the oxide layer 12. However, in this optical device 20 a grating means 21 is formed on one end of the silicon optical waveguide 13 as a conversion means for converting light propagating through the silicon optical waveguide 13 to parallel light and for outputting the parallel light.

The grating means 21 spreads the light propagated therein after passing through the silicon optical waveguide 13, and converts the light into a parallel optical beam of parallel light outputted towards the silicon substrate 11. The parallel light passes through the silicon substrate 11, and is outputted from the silicon substrate 11 upwards where there is an optical fiber 16.

Figure 3:
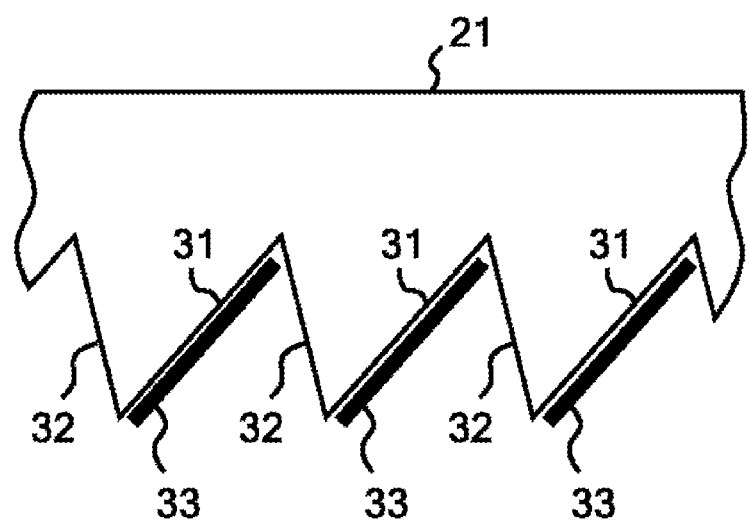
FIG. 3 is a partial cross-sectional view of the V-shaped grooves provided in the grating means of the optical device shown in FIG. 2.

FIG. 3 is a partial cross-sectional view of the V-shaped grooves provided in the grating means 21 as the diffraction grating structure. As in the case of the grating coupler 14 in FIG. 1, a plurality of concentric circular V-shaped grooves are provided in parallel. In order to improve the diffraction efficiency and directionality of the light, the fine surface 31 on one side of each V-shaped groove has a roughly 45-degree incline with respect to the substrate surface 21, and the fine surface 32 on the other side is formed so as to be as perpendicular as possible. A metal film 33 of gold, silver or aluminum is formed on the fine surface 31 to make it a reflective surface.

Returning to FIG. 2, the parallel light outputted from the silicon substrate 11 strikes the convex lens surface 23 of the lens 22 provided as a lens means for focusing the parallel light on the core 15 of the optical fiber 16. The convex lens surface 23 which the parallel light strikes is formed to focus the parallel light on a focal point inside the lens 22.

A recess 24 for accommodating the optical fiber 16 is formed on the side of the lens 22 opposite the convex lens surface 23. The recess 24 is formed in the center so the parallel light focused inside the lens 22 is directed at the focal point. The core 15 of the optical fiber 16 is positioned in the center of the recess 24. Therefore, the optical fiber 16 becomes aligned when the optical fiber is placed inside the recess 24.

Unlike the optical device 10 in FIG. 1, which has a structure that focuses the light using a grating coupler 14 and directly aligns the focused light with the core 15 of the optical fiber 16, the optical device 20 in FIG. 2, which has a structure that converts light into parallel light using a grating means 21 and aligns the parallel light with the core 15 of the optical fiber 16 via a lens 22, does not require direct alignment of the optical fiber with a high degree of precision. Because the convex lens surface 23 and the recess 24 of the lens 22 can be manufactured with a high degree of precision, using a molding process, the optical device 20 achieves high optical coupling efficiency.

Figure 4:
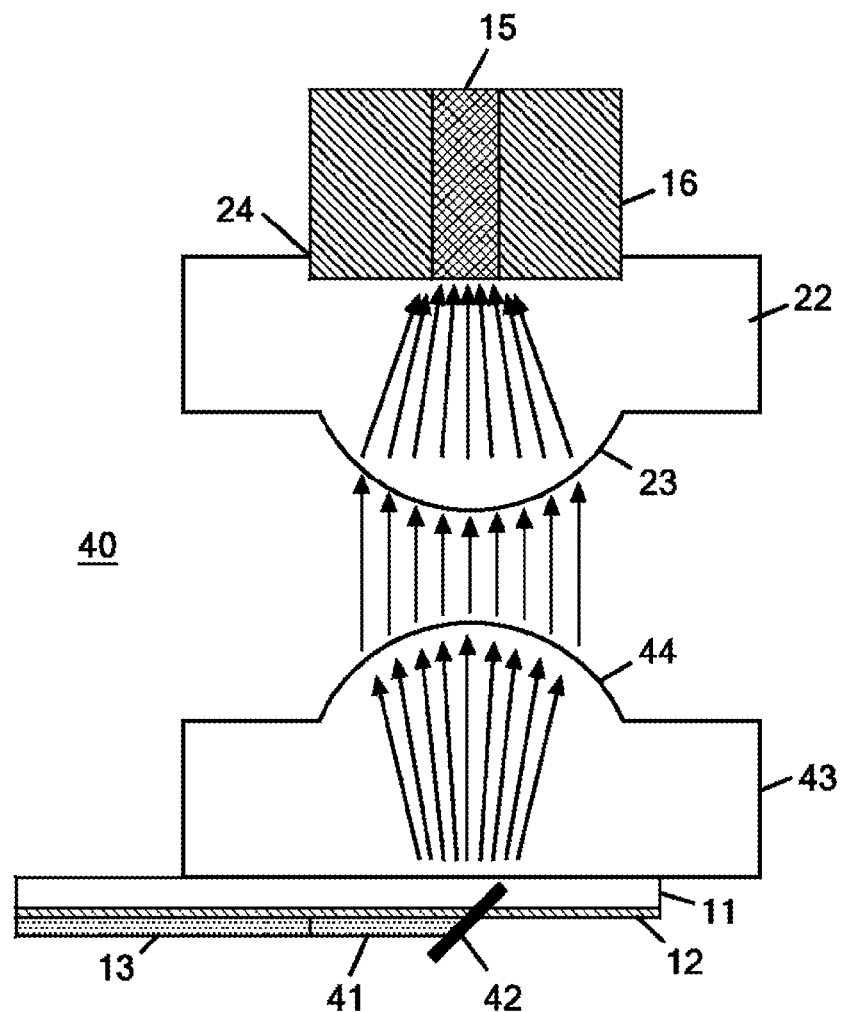
FIG. 4 is a diagram schematically illustrating the optical device for optically coupling an optical waveguide and an optical fiber according to an embodiment of the present invention.

FIG. 4 is a diagram schematically illustrating the optical device 40 for optically coupling an optical waveguide and an optical fiber in another embodiment of the present invention. FIG. 4 shows only a cross-sectional side view of the optical device 40.

In this optical device 40, an oxide layer 12 is provided on a silicon substrate 11, and a silicon optical waveguide 13 is formed on the oxide layer 12. However, in the optical device 40, the conversion means provided on one end of the silicon optical waveguide 13 to convert the light propagating through the silicon optical waveguide 13 to parallel light and to output the parallel light is not a grating means 21 as shown in FIG. 2 and FIG. 3. Instead, an extended portion 41 of the silicon optical waveguide 13 is provided on the oxide layer 12, and a reflective plate 42 is provided on one end of the extended portion 41 which forms a 45-degree incline to reflect the propagation light. A lens 43 is also provided on the silicon substrate 11 on the side opposite the oxide layer 12, which has a focal point at the point where the propagation light is reflected by the reflective plate 42. This lens 43 converts the light reflected by the reflective plate 42 into parallel light.

The lens 43 has a convex lens surface 44 on the side opposite the silicon substrate 11 on which it is arranged. The light reflected by the reflective plate 42 widens inside the lens 43 and reaches the convex lens surface 44. The light is then outputted from the convex lens surface 44 as parallel light.

As in the optical device 20 of FIG. 2, the parallel light outputted from the convex lens surface 44 of the lens 43 strikes the convex lens surface 23 of a lens 22 provided as a lens means for focusing the parallel light on the core 15 of the optical fiber 16. As in the case of optical device 20, optical device 40 does not require direct alignment by the lens 22 of the optical fiber with a high degree of precision. Also, because the convex lens surface 44 of the lens 43 can be manufactured with a high degree of precision using a molding process, optical device 40 achieves high optical coupling efficiency.

FIG. 2 and FIG. 4 show optical coupling for communication in which light travels from the silicon optical waveguide 13 to the optical fiber 16. However, optical devices 20 and 40 can also be used to perform optical coupling with a high degree of optical coupling efficiency for communication in which light travels from the optical fiber 16 to the silicon optical waveguide 13.

The present invention was explained above using an embodiment, but the technical scope of the present invention is not limited in any way by this embodiment. It should be clear to a person of skill in the art that various modifications and improvements can be made without departing from the spirit and scope of the present invention.

What is claimed is:

1. An optical device comprising:
    a conversion means for converting propagation light propagating through an optical waveguide into parallel light and for outputting the parallel light, the conversion means including a reflecting means forming a 45-degree tilted surface for reflecting the propagation light;
    a first lens overlying the conversion means for focusing the parallel light outputted from the conversion means on a core of an optical fiber, wherein the first lens includes a convex lens surface; and a second lens means opposite the convex lens surface of the first lens, the second lens means including a recess configured to accommodate the optical fiber for focusing the parallel light on the optical fiber.

2. The optical device according to claim 1, wherein the conversion means comprises:

a second lens, having a focal point at a point on which the propagation light is reflected by the reflecting means, that converts the propagation light reflected by the reflecting means into parallel light, wherein the second lens includes a convex lens surface.

3. The optical device according to claim 2, wherein the parallel light strikes the convex lens surface of the first lens so that the parallel light is focused on the core of the optical fiber.

4. The optical device according to claim 1, wherein the optical waveguide is a silicon thin-film waveguide.

5. A method for manufacturing an optical device comprising:

converting, using a second lens, propagation light propagating through an optical waveguide into parallel light, wherein the converting the propagation light further comprises forming a 45-degree tilted surface on a reflective surface for reflecting the propagation light; outputting the parallel light; and focusing, using a first lens, the parallel light on a core of an optical fiber, wherein the first lens includes a convex lens surface and wherein the second lens is positioned opposite the convex lens surface of the first lens, and includes a recess configured to accommodate the optical fiber for focusing the parallel light on the optical fiber.

6. The method for manufacturing an optical device according to claim 5, wherein converting the propagation light further comprises:

using a second lens having a focal point at a point on which the propagation light is reflected by the reflective surface to convert the propagation light reflected into parallel light, wherein the second lens includes a convex lens surface.

7. The method for manufacturing an optical device according to claim 6, wherein the parallel light strikes the convex lens surface of the first lens so that the parallel light is focused on the core of the optical fiber.

8. The method for manufacturing an optical device according to claim 5, wherein the optical waveguide is a silicon thin-film waveguide.

* * * * *